(12) United States Patent
Mao

(10) Patent No.: US 10,513,023 B2
(45) Date of Patent: Dec. 24, 2019

(54) POWER TOOL

(71) Applicant: CHERVON (HK) LIMITED, Wanchai (HK)

(72) Inventor: Guoxing Mao, Nanjing (CN)

(73) Assignee: Chevron (HK) Limited, Wanchai (HK)

(*) Notice: Subject to any disclaimer, the term of this patent is extended or adjusted under 35 U.S.C. 154(b) by 358 days.

(21) Appl. No.: 15/378,648

(22) Filed: Dec. 14, 2016

(65) Prior Publication Data

US 2017/0182647 A1 Jun. 29, 2017

(30) Foreign Application Priority Data

Dec. 28, 2015 (CN) .................. 2015 2 1112691 U

(51) Int. Cl.
*B25F 5/00* (2006.01)
*F16H 3/66* (2006.01)

(52) U.S. Cl.
CPC .............. *B25F 5/001* (2013.01); *F16H 3/66* (2013.01); *F16H 3/666* (2013.01); *F16H 2200/0034* (2013.01); *F16H 2200/2005* (2013.01); *F16H 2200/2007* (2013.01); *F16H 2200/2035* (2013.01); *F16H 2200/2064* (2013.01); *F16H 2200/2094* (2013.01)

(58) Field of Classification Search
CPC . B25F 5/001; F16H 3/66; F16H 3/666; F16H 2200/0034; F16H 2200/2005; F16H 2200/2007; F16H 2200/2035; F16H 2200/2064; F16H 2200/2094
See application file for complete search history.

(56) References Cited

U.S. PATENT DOCUMENTS

| | | | | |
|---|---|---|---|---|
| 2,941,420 A | * | 6/1960 | Graybill | B23G 1/465 475/270 |
| 3,217,564 A | * | 11/1965 | Smith | B23Q 5/048 475/270 |
| 9,097,331 B2 | * | 8/2015 | Saur | B25F 5/001 |
| 2007/0281822 A1 | * | 12/2007 | Maier | B25B 21/00 475/286 |
| 2008/0173459 A1 | * | 7/2008 | Kuroyanagi | B25F 5/001 173/216 |
| 2009/0233754 A1 | * | 9/2009 | Pedersen | F16H 3/66 475/296 |
| 2010/0186978 A1 | * | 7/2010 | Sekino | B23B 45/008 173/48 |
| 2011/0036605 A1 | * | 2/2011 | Leong | B25B 21/00 173/47 |

(Continued)

*Primary Examiner* — Alexander M Valvis
*Assistant Examiner* — David G Shutty
(74) *Attorney, Agent, or Firm* — Greenberg Traurig, LLP

(57) ABSTRACT

A power tool includes a motor with a drive shaft being capable of rotating around a first axis, a housing for containing the motor, an output shaft for outputting torque, a transmission mechanism for transferring power between the drive shaft and the output shaft, and an adjusting device for adjusting ratios between the drive shaft and the output shaft. The transmission mechanism includes a first planet gear assembly including a first planet gear and a first planet carrier, a second planet gear assembly including a second planet gear and a second planet carrier, and a ring gear with inner teeth. The first and second planet gears can be engaged with the ring gear and the first and second planet gears are engaged with the first and second sun gears, respectively.

11 Claims, 5 Drawing Sheets

(56) References Cited

U.S. PATENT DOCUMENTS

2013/0105186 A1* 5/2013 Pedersen ................ B25F 5/001
   173/1
2017/0182647 A1* 6/2017 Mao .......................... F16H 3/66
2017/0182648 A1* 6/2017 Mao .......................... F16H 3/66

* cited by examiner

＃ POWER TOOL

RELATED APPLICATION INFORMATION

This application claims the benefit under 35 U.S.C. § 119(a) of Chinese Patent Application No. CN 201521112691.0, filed on Dec. 28, 2015, the disclosure of which is incorporated herein by reference in its entirety.

FIELD OF THE DISCLOSURE

The present disclosure relates generally to power tools and, more particularly, to an electric drill.

BACKGROUND OF THE DISCLOSURE

Power tools, such as electric drills and electric screwdrivers, commonly include a motor, a transmission mechanism and an output shaft. The motor includes a drive shaft. The drive shaft is used to drive the transmission mechanism so as to output power to the output shaft.

When these tools are operated as hand held power tools, a user needs to grip the tool with one or two hands. If the hand held power tools have a large size, obviously, they are not good to operate. So, hand held power tools are hoped not only to satisfy the requirements of torque, speed and power, but also have small size.

However, for currently known power tools, in order to obtain large output torque, the transmission mechanism commonly includes a multi-stage planet gear system. And in order to obtain different speeds, the transmission mechanism also includes a ring gear that is able to move up and down, which makes power tools have a large axial size and goes against the desire for miniaturization.

The statements in this section merely provide background information related to the present disclosure and may not constitute prior art.

SUMMARY

In one aspect of the disclosure, a power tool includes a motor with a drive shaft being capable of rotating around a first axis, a housing for containing the motor, an output shaft for outputting torque, a transmission mechanism for transferring power between the drive shaft and the output shaft, and an adjusting device for adjusting ratios between the drive shaft and the output shaft. The drive shaft is connected with or formed with a first sun gear and a second sun gear which are capable of rotating with the drive shaft. The transmission mechanism includes a first planet gear assembly including a first planet gear and a first planet carrier, where the first planet gear is rotatably mounted on the first planet carrier, a second planet gear assembly including a second planet gear and a second planet carrier, where the second planet gear is rotatably mounted on the second planet carrier, and a ring gear with inner teeth. The first and second planet gears can be engaged with the ring gear and the first and second planet gears are engaged with the first and second sun gears, respectively. The adjusting device includes a locking element being capable of moving relative to the housing. The locking element at least is provided with a first position that locks the relative rotation between the first planet carrier and the housing and a second position that locks the relative rotation between the ring gear and the housing. When the locking element is in the first position, a transmission ratio between the drive shaft and the second planet carrier is defined as a first transmission ratio. When the locking element is in the second position, a transmission ratio between the drive shaft and the second planet carrier is defined as a second transmission ratio.

Further areas of applicability will become apparent from the description provided herein. It should be understood that the description and specific examples are intended for purposes of illustration only and are not intended to limit the scope of the present disclosure.

Figure 1:
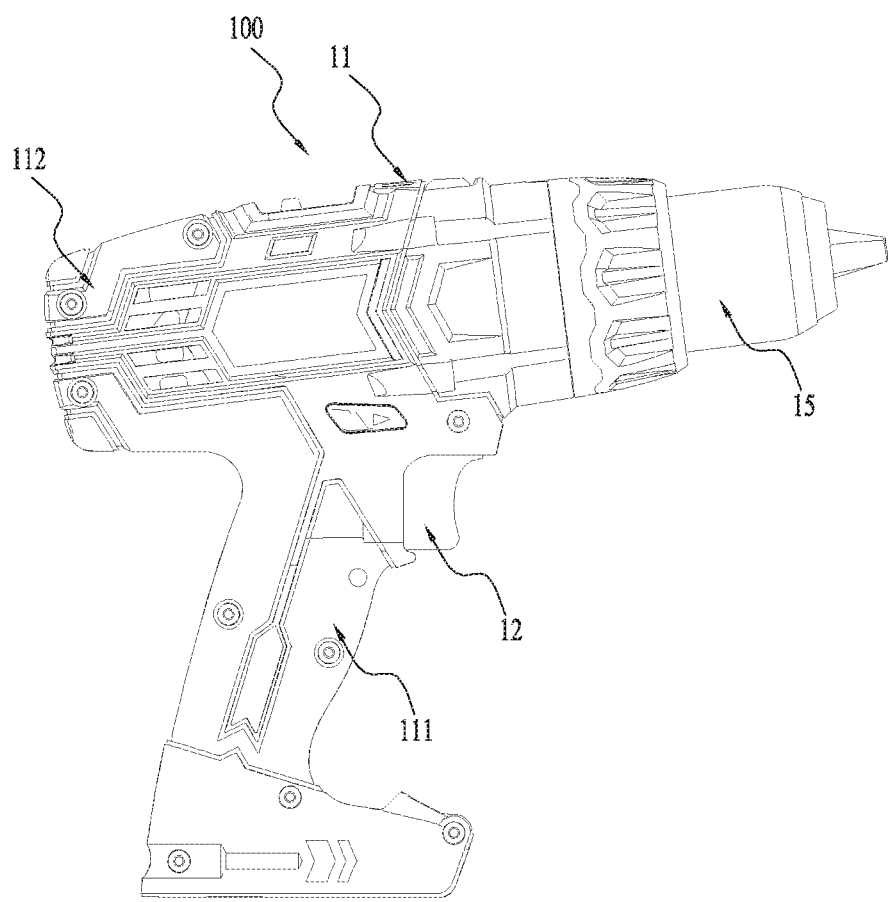
FIG. 1 is a schematic view of an exemplary power tool.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

The following description of the preferred embodiments is merely exemplary in nature and is in no way intended to limit the scope of the invention hereinafter claimed, its application, or uses.

As shown in FIG. 1, a power tool 100 includes a housing 11 and a switch 12.

Figure 2:
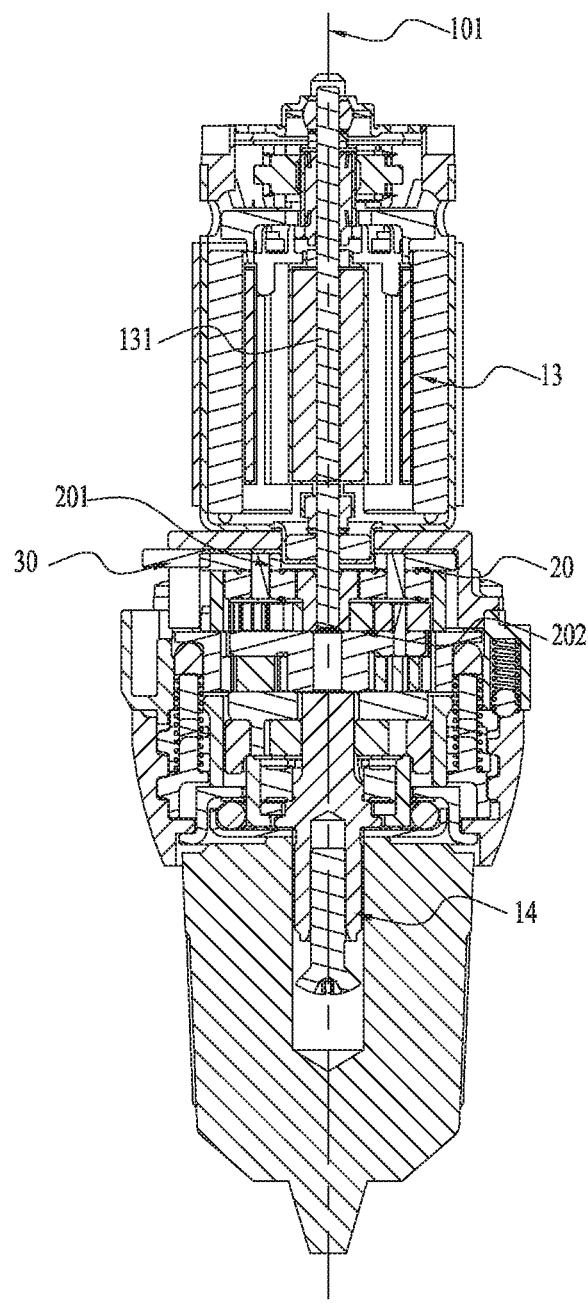
FIG. 2 is a section view of a part of the power tool in FIG. 1.
Figure 3:
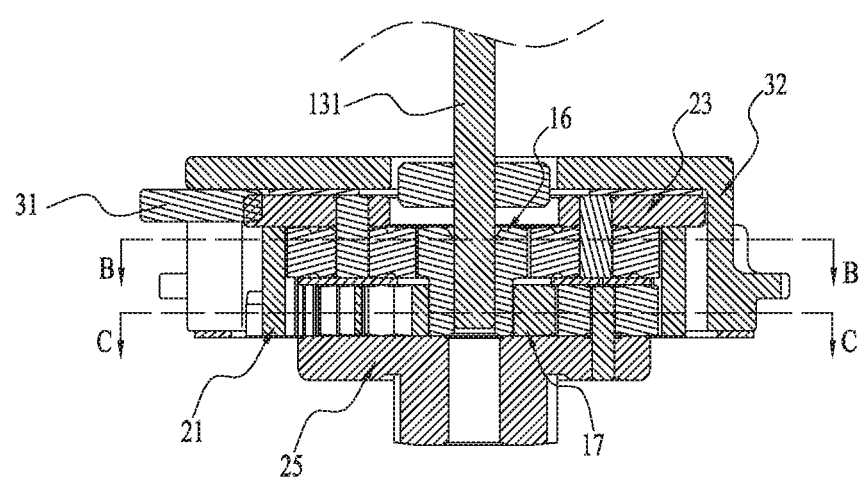
FIG. 3 is a section view of an exemplary transmission mechanism and an exemplary adjusting device in FIG. 2.
Figure 4:
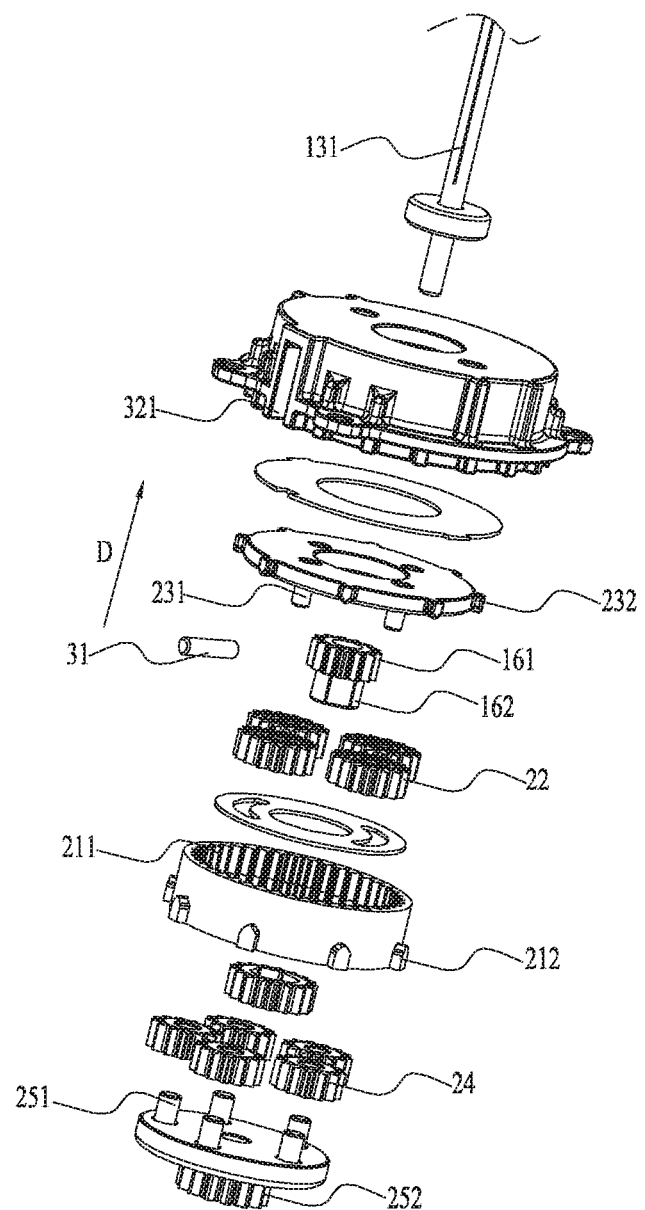
FIG. 4 is an exploded view of the structures in FIG. 3.
Figure 5:
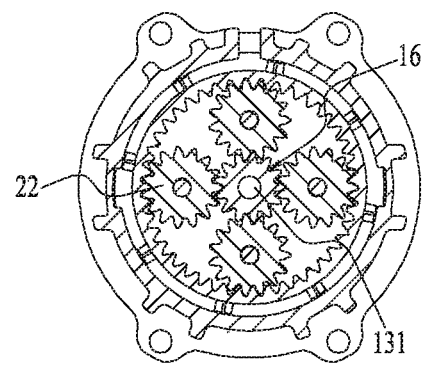
FIG. 5 is a section view of the structures in FIG. 3 cut along line B-B.
Figure 6:
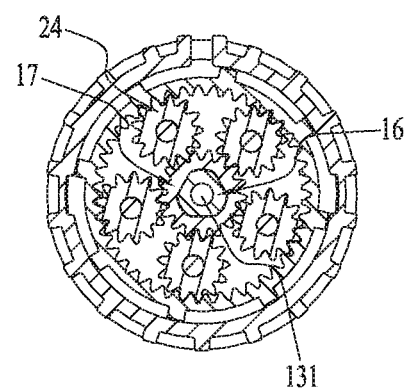
FIG. 6 is a section view of the structures in FIG. 3 cut along line C-C.

As shown in FIG. 2, the power tool 100 further includes a motor 13, an output shaft 14, a transmission mechanism 20 and an adjusting device 30.

For illustrating convenience, the power tool 100 takes the form of an electric drill as an example. However, the power tool 100 may be other power tools, such as an electric screwdriver or a multi-function tool with the functions of an electric screwdriver and an electric drill. Or, the power tool 100 may be other tools that are capable of converting the output torque into other movements. These tools may be used to grind a workpiece, such as a sander and an angle grinder. These tools may be used to cut the workpiece, such as a reciprocating saw, a circular saw and a jig saw. These tools may be used to impact the workpiece, such as a hammer. These tools may be garden tools, such as a hedge trimmer and a chain saw. These tools may be for other uses, such as a blender.

As long as these tools include the transmission mechanism 20 arranged between the motor 13 and the output shaft 14, the embodiments described hereinafter can be adopted for use therewith.

As shown in FIG. 1, the housing 11 is configured to contain components in the power tool 100. The housing 11 includes a handle portion 111 and a containing portion 112. The handle portion 111 is provided for a user to grip. The containing portion 112 is formed with a containing space for containing the components. The switch 12 is mounted on the handle portion 111.

When the user grips the handle portion 111, the user can activate the switch 12 conveniently. The switch 12 can be set as a main switch for starting the power tool 100. For the electric drill, it can include a clamping device 15 for clamping a tool bit on the power tool 100 and transfer the power to the tool bit through the clamping device 15 so as to realize the function of the power tool 100.

The motor 13 is used to convert the energy supplied by an energy source into power and output the power. The motor 13 includes a drive shaft 131 being capable of rotating around a first axis 101. One end of the drive shaft 131 is used to transfer the power to the transmission mechanism 20.

The output shaft 14 is used to output torque, which can be rotated around the first axis 101.

The transmission mechanism 20 is arranged between the motor 13 and the output shaft 14 for transferring power between the drive shaft 131 of the motor 13 and the output shaft 14.

The adjusting device 30 is used to adjust a transmission ratio between the drive shaft 131 and the output shaft 14, so that the output shaft 14 can output at different speeds and then the power tool 100 can output different torques.

For illustrating clearly, a direction of the first axis 101 and a direction parallel to the first axis 101 are defined as an axial direction and, a peripheral direction centered on the first axis 101 is defined as a circumferential direction.

Referring to FIGS. 1-6, the power tool 100 includes a first sun gear 16 and a second sun gear 17 which can be rotated with the drive shaft 131.

The transmission mechanism 20 includes a first planet gear assembly 201, a second planet gear assembly 202 and a ring gear 21. The first planet gear assembly 201 includes a first planet gear 22 and a first planet carrier 23. The first planet gear 22 is rotatably mounted on the first planet carrier 23 and engaged with the first sun gear 16. The second planet gear assembly 202 includes a second planet gear 24 and a second planet carrier 25. The second planet gear 24 is rotatably mounted on the second planet carrier 25 and engaged with the second sun gear 17. The ring gear 21 is provided with inner teeth 211. The first and second planet gears 22, 24 are arranged in the ring gear 21 and are able to engage with the ring gear 21 at the same time.

The adjusting device 30 includes a locking element 31 being capable of moving relative to the housing 11 along a first direction D substantially parallel to the first axis 101. When the locking element 31 is moved along the first direction D, it has a first position, a second position and a third position.

When the locking element 31 is in the first position, the rotation of the first planet carrier 23 relative to the housing 11 is locked. At this moment, the transmission ratio between the drive shaft 131 and the second gear carrier 25 is defined as a first transmission ratio and the second gear carrier 25 can output power at a first speed. When the locking element 31 is in the second position, the rotation of the ring gear 21 relative to the housing 11 is locked. At this moment, the transmission ratio between the drive shaft 131 and the second gear carrier 25 is defined as a second transmission ratio and the second gear carrier 25 can output power at a second speed. The second transmission ratio is different from the first transmission ratio. Furthermore, the second transmission ratio is lower than the first transmission ratio. When the locking element 31 is in the third position, the first planet carrier 23 and the ring gear 21 are released at the same time, so that the first planet carrier 23 and the ring gear 21 can rotate relative to the housing 11. At this moment, the second planet carrier 25 is in an idle state.

So, the different transmission ratios between the drive shaft 131 and the second gear carrier 25 can be realized only through moving the locking element 31 up and down and the power tool 100 can output different torques. Further, because the first and second planet gear assemblies 201, 202 share the same ring gear 21 and the ring gear 21 is not needed to move up and down so as to be locked and released, the transmission mechanism 20 has small axial size so that the power tool 100 has a small size.

Specifically, the first and second sun gears 16, 17 and the drive shaft 131 can be integrated or separated. In the illustrated example they are separated by way of example only.

The first sun gear 16 includes an engaging portion 161 and an extending portion 162 which are formed at different axial positions of the first sun gear 16. The engaging portion 161 includes engaging teeth for transferring power. The extending portion 162 is used to mount the second sun gear 17. The second sun gear 17 is mounted on the extending portion 162 of the first sun gear 16 and is able to rotate with the first sun gear 16 synchronously. The second sun gear 17 includes engaging teeth for transferring power which have the same shape as the engaging teeth of the first sun gear 16. Otherwise, the second sun gear 17 has an addendum circle radius which is larger than an addendum circle radius of the first sun gear 16, so the engaging teeth of the second sun gear 17 are more than the engaging teeth of the first sun gear 16.

The first planet gear 22 is engaged with the engaging portion 161 of the first sun gear 16. The first planet gear assembly 201 includes a plurality of first planet gears 22, for example, four first planet gears 22. The four first planet gears 22 are arranged around the first sun gear 16. The engaging teeth of the first planet gears 22 are more than the engaging teeth of the first sun gear 16.

First pins 231 are mounted on the first planet carrier 23. The first planet gears 22 are rotatably mounted on the first pins 231. When the first planet carrier 23 is not locked, it can rotate circumferentially relative to the housing 11. The first planet carrier 23 is provided with first limiting portions 232 on its outer side which are raised structures extending from the first planet carrier 23.

The second planet gear 24 is engaged with the second sun gear 17. The second planet gear assembly 202 includes a plurality of second planet gears 24, for example, five second planet gears 24. The five second planet gears 24 are arranged around the second sun gear 17. The engaging teeth of the second planet gears 24 are less than the engaging teeth of the second sun gear 17. So, a ratio of the number of engaging teeth between the first sun gear 16 and the first planet gear 22 is lower than a ratio of the number of engaging teeth between the second sun gear 17 and the second planet gear 24.

Second pins 251 are mounted on the second planet carrier 25. The second planet gears 24 are rotatably mounted on the second pins 251. The second planet carrier 25 is provided with an output portion 252 for outputting the power of the second planet carrier 25.

The ring gear 21 is positioned around the first and second planet gears 22, 24, which has a fixed axial position. The ring gear 21 is formed with the inner teeth 211 on the inner side and second limiting portions 212 on the outer side for engaging with the locking element 31. The second limiting portions 212 can be raised structures extending from the outer side of the ring gear 21. When the ring gear 21 is not locked, it can rotate circumferentially relative to the housing 11. When the locking element 31 is engaged with the second limiting portions 212, the circumferential rotation of the ring gear 21 is locked.

Preferably, there is a distance between the first limiting portions 232 of the first planet carrier 23 and the second limiting portions 212 of the ring gear 21 in the axial direction. When the locking element 31 is moved between the first limiting portions 232 and the second limiting portions 212 in the axial direction, the first planet carrier 23 and the ring gear 21 are released.

The locking element 31 is a locking pin which can be driven by the user to move to the first position engaging with the first limiting portions 232, the second position engaging with the second limiting portions 212 and the third position between the first and second positions. In order to guide the movement of the locking pin, the adjusting device 30 includes a guiding element which can be a guiding wall 32. The guiding wall 32 is formed with a guiding slot 321 that extends axially. The locking pin can pass through the guiding slot 321.

When the locking element 31 is moved to the first position engaging with the first limiting portions 232, the rotation of the first planet carrier 23 relative to the housing 11 is locked, and the ring gear 21 is released. At this moment, when the motor 13 is started, the drive shaft 131 transfers the power to the first sun gear 16, and then the first sun gear 16 transfers the power to the first planet gear 22. Because the first planet carrier 23 is locked, the first planet gear 22 transfers the power to the ring gear 21 so that the ring gear 21 is rotated. Meanwhile, the drive shaft 131 transfers the power to the second sun gear 17. At this moment, the second planet gear 24, the second sun gear 17 and the ring gear 21 constitute a transmission gear system with double input. So, the second planet carrier 25 outputs at low speed, and the relatively larger first transmission ratio is generated between the drive shaft 131 and the second planet carrier 25.

When the locking element 31 is moved to the second position engaging with the second limiting portions 212, the rotation of the ring gear 21 relative to the housing 11 is locked. At this moment, when the motor 13 is started, the drive shaft 131 transfers the power to the first sun gear 16, and then the first sun gear 16 transfers the power to the first planet gear 22. Because the ring gear 21 is fixed, the first planet gear 22 transfers the power to the first planet carrier 23. However, the first planet carrier 23 is not connected with the output device, so it just idles and does not output power. Meanwhile, the drive shaft 131 transfers the power to the second sun gear 17, and then the second sun gear 17 transfers the power to the second planet gear 24. Because the ring gear 21 is fixed, the second planet gear 24 transfers the power to the second planet carrier 25, so that only the second planet gear assembly 202 acts as a speed reducer. So, the second planet carrier 25 outputs at high speed. And the relatively smaller second transmission ratio is generated between the drive shaft 131 and the second planet carrier 25.

The above illustrates and describes basic principles, main features and advantages of the present invention. Those skilled in the art should appreciate that the above embodiments do not limit the present invention in any form. Technical solutions obtained by equivalent substitution or equivalent variations all fall within the scope of the invention as claimed below.

What is claimed is:

1. A power tool, comprising:
   a motor with a drive shaft being capable of rotating around a first axis;
   a housing for containing the motor;
   an output shaft for outputting torque;
   a transmission mechanism for transferring power between the drive shaft and the output shaft; and
   an adjusting device for adjusting transmission ratios between the drive shaft and the output shaft;
   wherein the drive shaft is connected with a first sun gear and a second sun gear which are capable of rotating with the drive shaft,
   wherein the transmission mechanism comprises a first planet gear assembly comprising a first planet gear and a first planet carrier, where the first planet gear is rotatably mounted on the first planet carrier, a second planet gear assembly comprising a second planet gear and a second planet carrier, where the second planet gear is rotatably mounted on the second planet carrier, and a ring gear with inner teeth,
   wherein the first and second planet gears can be engaged with the ring gear and the first and second planet gears are engaged with the first and second sun gears, respectively,
   wherein the adjusting device comprises a locking element being capable of moving relative to the housing, where the locking element at least is moveable to a first position that locks a relative rotation between the first planet carrier and the housing and a second position that locks another relative rotation between the ring gear and the housing,
   wherein, when the locking element is in the first position, the transmission ratio between the drive shaft and the second planet carrier is defined as a first transmission ratio and, when the locking element is in the second position, the transmission ratio between the drive shaft and the second planet carrier is defined as a second transmission ratio, and
   wherein the first sun gear is closer to the motor than the second sun gear, the first sun gear comprises an engaging portion allowing the first sun gear to engage with the first planet gear and an extending portion for mounting the second sun gear, the second sun gear is not integrally formed with the extension portion, the extension portion comprise a flat portion, the second sun gear is formed with a flat hole matched with the extension portion, and the first sun gear has an addendum circle radius which is less than an addendum circle radius of the second sun gear.

2. The power tool of claim 1, wherein the first transmission ratio is higher than the second transmission ratio.

3. The power tool of claim 1, wherein the locking element is further moveable to a third position that allows the first planet carrier and the ring gear to rotate relative to the housing.

4. The power tool of claim 1, wherein the first sun gear has the same tooth shape as the second sun gear.

5. The Power tool of claim 1, wherein the first planet gear has more teeth than the first sun gear.

6. The power tool of claim 1, wherein the second sun gear has more teeth than the second planet gear.

7. The power tool of claim 1, wherein a ratio of the number of teeth between the first sun gear and the first planet gear is lower than a ratio of the number of teeth between the second sun gear and the second planet gear.

8. The power tool of claim 1, wherein the first planet carrier comprises first limiting portions for engaging with the locking element in the first position, where the first limiting portions are arranged on the outer side of the first planet carrier, and the ring gear comprises second limiting portions for engaging with the locking element in the second position, where the second limiting portions are arranged on the outer side of the ring gear, and wherein there is a distance between the first and second limiting portions in an axial direction.

9. The power tool of claim 1, wherein the extending portion allows the second sun gear to rotate with the first sun gear synchronously.

10. The Power tool of claim 1, wherein the locking element is a locking pin extending in a direction substantially perpendicular to the first axis, the adjusting device comprises a guiding element for guiding the locking pin to move along a direction substantially parallel to the first axis.

11. The power tool of claim 1, wherein the power tool is an electric drill or an electric screwdriver.

* * * * *